Patented Nov. 19, 1940

2,221,792

UNITED STATES PATENT OFFICE 2,221,792

PHOTOGRAPHIC MATERIAL AND PROCESS OF MAKING SAME

Béla Gáspár, Hollywood, Calif., and László Schwarc, Brussels, Belgium; said Schwarc assignor to said Gáspár No Drawing. Application May 9, 1939, Serial No. 272,720. In Germany May 23, 1938

19 Claims. (Cl. 95—6)

There is described in Béla Gáspár's United States Letters Patent No. 2,172,307 dated September 5, 1939, a very simple and reliable process of incorporating insoluble or but slightly soluble dyes in photographic emulsions or emulsion layers. In this process there are added to the emulsions or to the layers or to the soutions from which the emulsions or layers are prepared, such soluble derivatives of the dyes as can be split up within the emulsion or gelatin by harmless reagents. To this end, it was proposed to use the bisulphite or aldehyde bisulphite compounds of azo dyes or the ω-sulphonic acid salts of amino azo dyes.

It has now been discovered that the bisulphite compounds and the soluble hydrazones derived from such insoluble or slightly soluble azo dyes that contain a carbonyl group in the form of a ketone or aldehyde group are especially suitable for this purpose.

The dyes yielded by the splitting up of the soluble derivatives in the layer and containing ketone or aldehyde groups are particularly suitable for use in light-sensitive layers for the bleach-out-process, as they are easily destroyable to yield a dye image.

These soluble compounds of the azo dyes containing carbonyl groups are particularly easily obtainable, as they may be prepared by simple reaction, with great reliability and good yield. They are also more easily split up and more soluble than the dye derivatives hitherto employed, and they also afford an opportunity of using amino dyes that previously could only be used in the form of their ω-sulphonic acids that are difficult to obtain. The dye derivatives requisite for practising the process may, for instance, be prepared as follows:

*Example 1.*—1.1 grams of the blackish-purple amino-azo dye from diazotized p-amino-benzaldehyde and α-naphthylamine are suspended in 5 ccs. of alcohol. Thereupon 30 ccs. of 40% bisulphite solution are added, and the whole is kept on a water-bath for four hours at about 70° C. The residue is dissolved in water, filtered and salted out with common salt.

The yellow bisulphite compound thus obtained is highly soluble in water and may easily be split up by means of diluted alkalis and sodium carbonate solution, such as n/2 sodium hydroxide solution.

*Example 2.*—1.3 grams of the orange oxyazo dye from diazotized p-amino acetophenone and β-naphthol are suspended in 5 ccs. of alcohol. Thereupon 30 ccs. of 40% bisulphite solution are added, and the whole is kept on a water-bath for four hours at 70° C. The residue is dissolved in water, filtered and the yellow bisulphite compound salted out with common salt.

*Example 3.*—1.1 grams of the red oxyazo dye from diazotized p-aminobenzaldehyde and β-naphthol are suspended in 5 ccs. of alcohol. Thereupon 20 ccs. of 15% p-sulpho-phenylhydrazine solution are added, and the whole is kept on a water-bath for four hours at about 70° C. The residue is dissolved in water, filtered and the grey-black hydrazone salted out with common salt.

*Example 4.*—1.5 grams of the red oxyazo dye from diazotized p-aminobenzaldehyde and n-benzoyl-1-amino-4-naphthol are suspended in 5 ccs. of alcohol. Thereupon 20 ccs. of 15% p-sulphophenylhydrazine solution are added, and the whole is kept on a water-bath for four hours at about 70° C. The residue is dissolved in water, filtered and the grey-black hydrazone is salted out with common salt.

The dye derivatives thus prepared may be introduced into gelatin by the means described in detail in the above mentioned patent specification, afterwards split up and processed to colored gelatin emulsion layers or sensitized silver halide emulsion layers.

*Example 5.*—5 grams of the hydrazone prepared according to Example 4 are dissolved in 400 ccs. of water, and the resulting solution is used to steep 30 grams of gelatin. After the gelatin has been dissolved by gentle warming, the p-sulphophenylhydrazine group is split off by the addition of 25 ccs. 2n-acetic acid solution and warming to 40° to 45° C., the whole being stirred for an hour. The solution is neutralized with 25 ccs. 2n-caustic soda and filtered. The gelatin solution is chilled with ice, and after coagulating, it is washed with water.

The colored gelatin is then mixed with about 250 ccs. of sensitized silver halide emulsion, or used to prepare a light-sensitive silver halide emulsion, which is then poured on to the support.

In exactly the same manner the sulphophenylhydrazone obtained according to Example 3 may be used. Instead of using acetic acid for splitting up the hydrazones other acids such as hydrochloric acid may be used.

When multilayer material is produced from layers made in accordance with the new process, all layers may be colored with the new dye derivatives, which are split or are capable of being split, or such layers may be used in combination with layers that are colored in accordance with the method described in the above mentioned patent specification or according to any other process, or in combination with layers that are not colored, or that may contain dye components.

Moreover, it lies within the scope of the present invention that the compounds produced in an insoluble form according to the new process of this invention need not be dyes in the narrow sense of the term, i. e. substances that absorb a part of the visible light, but they may be dyes in the wider sense of the word, i. e. such substances that absorb light in the invisible spectral regions, or that may be converted subsequently by chemical reaction to colored substances and thus act as dye-formers.

What is claimed is:

1. The method of coloring a photographic material with an azo dye which comprises dissolving in the colloid used for the formation of a layer of the photographic material a water-soluble compound which is splittable by hydrolysis to form a substantially water-insoluble azo-dye containing a carbonyl substituent selected from the group consisting of aldehydes and ketones, and which is derived from such dye by the interaction of the said carbonyl group with a salt forming compound, and splitting off the azo dye from the dissolved compound by hydrolysis.

2. The method of coloring a photographic material with an azo dye which comprises dissolving in the colloid used for the formation of a layer of the photographic material a water-soluble compound which is splittable by hydrolysis to form a substantially water-insoluble ortho-oxy azo dye containing a carbonyl substituent selected from the group consisting of aldehydes and ketones, and which is derived from such dye by the interaction of the said carbonyl group with a salt forming compound, and splitting off the azo dye from the dissolved compound by hydrolysis.

3. The method of coloring a photographic material with an azo dye which comprises dissolving in the colloid used for the formation of a layer of the photographic material a water-soluble compound which is splittable by hydrolysis to form a substantially water-insoluble azo dye containing a carbonyl substituent selected from the group consisting of aldehydes and ketones, and which is derived from such dye by the interaction of said carbonyl group with a bisulphite compound, and splitting off the azo dye from the dissolved compound by hydrolysis.

4. The method of coloring a photographic material with an azo dye which comprises dissolving in the colloid used for the formation of a layer of the photographic material a water-soluble compound which is splittable by hydrolysis to form a substantially water-insoluble ortho-oxy azo dye containing a carbonyl substituent selected from the group consisting of aldehydes and ketones, and which is derived from such dye by the interaction of the said carbonyl group with a bisulphite compound, and splitting off the azo dye from the dissolved compound by hydrolysis.

5. The method of coloring a photographic material with an azo dye which comprises dissolving in the colloid used for the formation of a layer of the photographic material a water-soluble compound which is splittable by hydrolysis to form a substantially water-insoluble azo dye containing a carbonyl substituent selected from the group consisting of aldehydes and ketones, and which is derived from such dye by the interaction of the said carbonyl group with a sulphophenylhydrazine compound, and splitting off the azo dye from the dissolved compound by hydrolysis.

6. The method of coloring a photographic material with an azo dye which comprises dissolving in the colloid used for the formation of a layer of the photographic material a water-soluble compound which is splittable by hydrolysis to form a substantially water-insoluble ortho-oxy azo dye containing a carbonyl substituent selected from the group consisting of aldehydes and ketones, and which is derived from such dye by the interaction of the said carbonyl group with a sulphophenylhydrazine compound, and splitting off the azo dye from the dissolved compound by hydrolysis.

7. A photographic colloid comprising a light-sensitive silver halide and an insoluble azo dye which has a ketone group in its molecule.

8. A photographic colloid comprising a light-sensitive silver halide and an insoluble ortho-oxy azo dye which has a ketone group in its molecule.

9. A photographic material including a colloid comprising a soluble compound derived by reacting a substantially water-insoluble azo dye containing a carbonyl substituent selected from the group consisting of aldehydes and ketones with a reagent which reacts with said carbonyl substituent, said soluble compound being splittable by hydrolysis to form said substantially insoluble azo dye.

10. A photographic material including a colloid comprising a soluble compound derived by reacting a substantially water-insoluble azo dye containing a ketone group with a reagent which reacts with said ketone group, said soluble compound being splittable by hydrolysis to form said substantially insoluble azo dye.

11. A photographic material including a colloid comprising a soluble compound derived by reacting a substantially water-insoluble azo dye containing an aldehyde group with a reagent which reacts with said aldehyde group, said soluble compound being splittable by hydrolysis to form said substantially insoluble azo dye.

12. A photographic material including a colloid comprising a soluble compound derived by reacting a substantially water-insoluble azo dye containing a carbonyl substituent selected from the group consisting of aldehydes and ketones with a bisulphite compound, said soluble compound being splittable by hydrolysis to form said substantially insoluble azo dye.

13. A photographic material including a colloid comprising a soluble compound derived by reacting a substantially water-insoluble azo dye containing a ketone group with a bisulphite compound, said soluble compound being splittable by hydrolysis to form said substantially insoluble azo dye.

14. A photographic material including a colloid comprising a soluble compound derived by reacting a substantially water-insoluble azo dye containing an aldehyde group with a bisulphite compound, said soluble compound being splittable by hydrolysis to form said substantially insoluble azo dye.

15. A photographic material including a colloid comprising a soluble compound derived by reacting a substantially water-insoluble azo dye containing a carbonyl substituent selected from the group consisting of aldehydes and ketones with a sulphophenyl-hydrazine compound, said soluble compound being splittable by hydrolysis to form said substantially insoluble azo dye.

16. A photographic material including a colloid comprising a soluble compound derived by reacting a substantially water-insoluble azo dye containing a ketone group with sulphophenyl-hydrazine, said soluble compound being splittable by hydrolysis to form said substantially insoluble azo dye.

17. A photographic material including a colloid comprising a soluble compound derived by reacting a substantially water-insoluble azo dye containing an aldehyde group with sulphophenyl-hydrazine, said soluble compound being splittable by hydrolysis to form said substantially insoluble azo dye.

18. A photographic material including a silver halide layer and a colloid comprising a soluble sulphophenyl-hydrazone compound derived by reacting a substantially water-insoluble azo dye containing a carbonyl substituent selected from the group consisting of aldehydes and ketones with sulphophenyl-hydrazine, said soluble compound being splittable by hydrolysis to form said substantially insoluble azo dye.

19. A photographic colloid comprising a light sensitive silver halide emulsion and a soluble compound derived by reacting a substantially insoluble azo dye containing a carbonyl substituent selected from the group consisting of aldehydes and ketones with a reagent which reacts with said carbonyl substituent, said soluble compound being splittable by hydrolysis to form said substantially insoluble azo dye.

BÉLA GÁSPÁR.
LÁSZLÓ SCHWARC.